United States Patent
Scordato et al.

[11] Patent Number: 5,826,936
[45] Date of Patent: Oct. 27, 1998

[54] VEHICLE SEAT ASSEMBLY WITH INERTIA LATCH

[75] Inventors: Joseph John Scordato, Elkhart, Ind.; Dale E. Lyons, Cassopolis, Mich.; Christopher George Pasternak, Mishawaka, Ind.; Ruben Hernandez, Roscoe, Ill.

[73] Assignee: Excel Industries, Inc., Elkhart, Ind.

[21] Appl. No.: 965,575

[22] Filed: Nov. 6, 1997

Related U.S. Application Data

[63] Continuation of Ser. No. 821,670, Mar. 19, 1997, abandoned.

[51] Int. Cl.$^6$ .................................................. B60N 2/42
[52] U.S. Cl. ........................... 297/216.1; 297/259.1; 297/262.1; 297/344.1
[58] Field of Search ............................ 297/261.1, 262.1, 297/258.1, 259.1, 344.1, 325, 329, 313, 337, 216.1

[56] References Cited

U.S. PATENT DOCUMENTS

| | | |
|---|---|---|
| 1,065,280 | 6/1913 | Stanger et al. . |
| 2,151,419 | 3/1939 | Buchner . |
| 2,161,366 | 6/1939 | Gregor . |
| 3,355,211 | 11/1967 | Kölle . |
| 5,183,236 | 2/1993 | Droulon . |
| 5,207,480 | 5/1993 | Johnson et al. ........................ 297/344 |
| 5,468,050 | 11/1995 | Hall et al. ............................ 297/344.1 |
| 5,481,941 | 1/1996 | Premji . |
| 5,567,013 | 10/1996 | Chang ..................................... 297/341 |

*Primary Examiner*—Peter M. Cuomo
*Assistant Examiner*—Stephen Vu
*Attorney, Agent, or Firm*—Banner & Witcoff, Ltd.

[57] ABSTRACT

A seat track assembly for a motor vehicle is disclosed, comprising: an upper track sub-assembly having an upper track; a lower track sub-assembly having a lower track and a stop, with the upper track being slidable over the lower track; and a positive engagement inertia latch for resisting axial sliding motion of the upper track sub-assembly relative the lower track sub-assembly in response to acceleration of the gear relative the lower track sub-assembly. The inertia latch preferably comprises a gear being movable between a non-latching position wherein the gear is rotatable in response to axial sliding of the upper track sub-assembly and a latching position wherein in response to a sudden change in velocity the gear engages the stop, locking the upper track sub-assembly with the lower track sub-assembly. The gear can be mounted on an axle. A base is affixed to the lower seat track sub-assembly, having a contoured surface which receives the axle. The stop can comprise an incline, preferably unitary with the base, and the gear can have gear teeth which wedgingly lockingly engage a rack of teeth on the incline. An all-belts-to-seat latch may also be used to resist both axial displacement and vertical dislocation of the upper seat track relative the lower seat track.

20 Claims, 4 Drawing Sheets

VEHICLE SEAT ASSEMBLY WITH INERTIA LATCH

This Application is a Continuation of U.S. patent application Ser. No. 08/821,670, filed on Mar. 19, 1997, now abandoned.

FIELD OF THE INVENTION

The present invention generally relates to mechanisms allowing for comfort adjustment of seats, and more particularly to improved seat track assemblies for fore and aft adjustment of seats in a motor vehicle.

BACKGROUND OF THE INVENTION

Seats in a motor vehicle are often adjustable at least in fore and aft directions (that is, towards the front and rear of the motor vehicle) by a seat track assembly. A lower seat track is affixed to the floor of the motor vehicle, either directly or mounted on a riser or other mounting assembly. An upper seat track is affixed to the underside of the vehicle seat, directly to a base of the seat or to an angled seat pan. The seat pan and the seat risers, where employed, allow the seat to be positioned at an angle and a height deemed suitable for an occupant of the motor vehicle. For the front seats of a motor vehicle, typically two laterally spaced seat track assemblies are employed, extending parallel each other in a fore-and-aft direction along each side of the seat base.

A comfort adjust master latch can be employed in seat track assemblies, comprising, for example, a spring-loaded latch member attached to the upper track and having a series of windows or detents which releasably engage latch teeth on the lower track. Overcoming the force of the spring disengages the latch member from the latch teeth, allowing the upper track to slide longitudinally relative the lower track to a desired position, where the latch member can reengage the latch teeth, thereby again securing the upper track to the lower track. However, if the master latch should fail or become jammed, the seat tracks would then be free to slide relative one another. It would therefore, be desirable to have an auxiliary mechanism for preventing seat track movement, that is, longitudinal movement or displacement of the upper seat tracks relative the lower seat tracks.

In addition to concerns regarding the master latch, recently developed "All-Belts-To-Seat" (ABTS) technology has added new constraints on seat track assembly design. Many traditional seat belt assemblies for motor vehicles were at least in part anchored to the motor vehicle body, such as having a shoulder belt attached to the "B-pillar", that is the portion of the motor vehicle immediately behind the front door. If an occupant was wearing such a seat belt and the motor vehicle experienced a rapid change in velocity, then the belt anchored to the motor vehicle body would hold the seat in position, in effect help resist motion of the upper seat tracks relative to the lower seat tracks. With the development of ABTS seat modules, the seat belt and shoulder belts are mounted directly to the seat base and back rest, instead of being attached to the motor vehicle. Thus in the event of a rapid change in vehicle velocity, the seat belt assembly does not serve to resist dislocation of the upper tracks (and the seat mounted on the upper tracks) relative the lower tracks. Thus, especially in the case of an ABTS seat module it would be highly desirable for the seat track assembly to have means beyond a traditional master latch for resisting dislocation of the upper tracks relative the lower tracks.

In view of the foregoing, it is an object of the present invention to provide a seat track assembly having an inertia latch for use in a motor vehicle seat to provide for at least fore and aft adjustment of the seat during normal operation, and locking engagement of the seat track assembly during rapid changes in velocity of the motor vehicle. It is an additional object of the present invention to provide, at least in preferred embodiments, a seat track assembly having an inertia latch that is in continuous positive engagement and not dependent on relative seat track positions. It is an additional object of the present invention, at least in preferred embodiments, to provide a seat track assembly having an inertia latch that is low cost and has a simple, non-complex design with good manufacturability. It is yet another related object of the present invention to provide such a seat track assembly with an inertia latch that is resettable after a rapid change in velocity and highly reliable in operation.

SUMMARY OF THE INVENTION

In accordance with these and other objects, there is provided a seat track assembly for a motor vehicle, comprising an upper track sub-assembly having at least one upper track, a lower track sub-assembly comprising at least one lower track and a stop, with the upper track being axially slidable over the lower track, and a positive engagement inertia latch preferably comprising a gear resisting such axial sliding motion in response to acceleration of the gear relative the lower seat track sub-assembly.

The inertia latch has a latching condition in which the gear is in an engagement position engaging the upper track sub-assembly and the stop, and the inertia latch resists longitudinal movement of the upper track sub-assembly relative to the lower track sub-assembly, and a non-latching condition in which the gear is in a non-engagement position not engaging the stop. The gear preferably rests on a contoured surface, affixed on the lower track, and can roll on the contoured surface. The gear can have gear teeth which are received in openings in the upper track sub-assembly as it slides over the lower track. The stop can comprise an incline affixed to the lower track, preferably having a rack of teeth which are engageable with the gear teeth as the gear moves into the latching position. The inertial forces acting on the gear in the event of sudden vehicle acceleration (here meaning typically deceleration) cause the gear to travel longitudinally along the incline toward the aforesaid stop and into engagement with the rack of teeth. As the gear climbs the rack of teeth, it wedgingly locks between the rack of teeth and the upper track sub-assembly, thereby restricting additional longitudinal displacement of the upper seat track sub-assembly relative the lower seat track sub-assembly. After the sudden change in velocity the gear is preferably urged back down into the valley and out of engagement with the rack of teeth by reverse travel of the upper track sub-assembly or other biasing means.

Optionally such seat track assemblies having one or more positive engagement inertia latches can also have an all-belts-to-seat latch for resisting vertical dislocation of the upper track. This ABTS latch can comprise an upper bracket attached to the upper seat track sub-assembly having at least one J-hook, and a lower bracket attached to a lower seat track having at least one downward flange corresponding to the J-hook wherein the downward flange is received by the J-hook, permitting fore-and-aft slidable motion in a normal operating condition, and limiting vertical dislocation of the upper track sub-assembly relative the lower track sub-assembly. The downward flange and the J-hook can cooperatively provide dislocation position fixing means for resisting fore-and-aft movement of the J-hook relative the downward flange upon upward dislocation of the upper track sub-assembly relative the lower track sub-assembly.

From the foregoing disclosure and the following more detailed description of various preferred embodiments it will be apparent to those skilled in the art that the present invention provides a significant advance in the technology and art of seat track assemblies. Particularly significant in this regard is the potential the invention affords for resisting dislocation of upper tracks from corresponding one or more lower tracks in response to a sudden change in the velocity of a motor vehicle. Additional features and advantages of various preferred embodiments will be better understood in view of the detailed description provided below.

Figure 1:
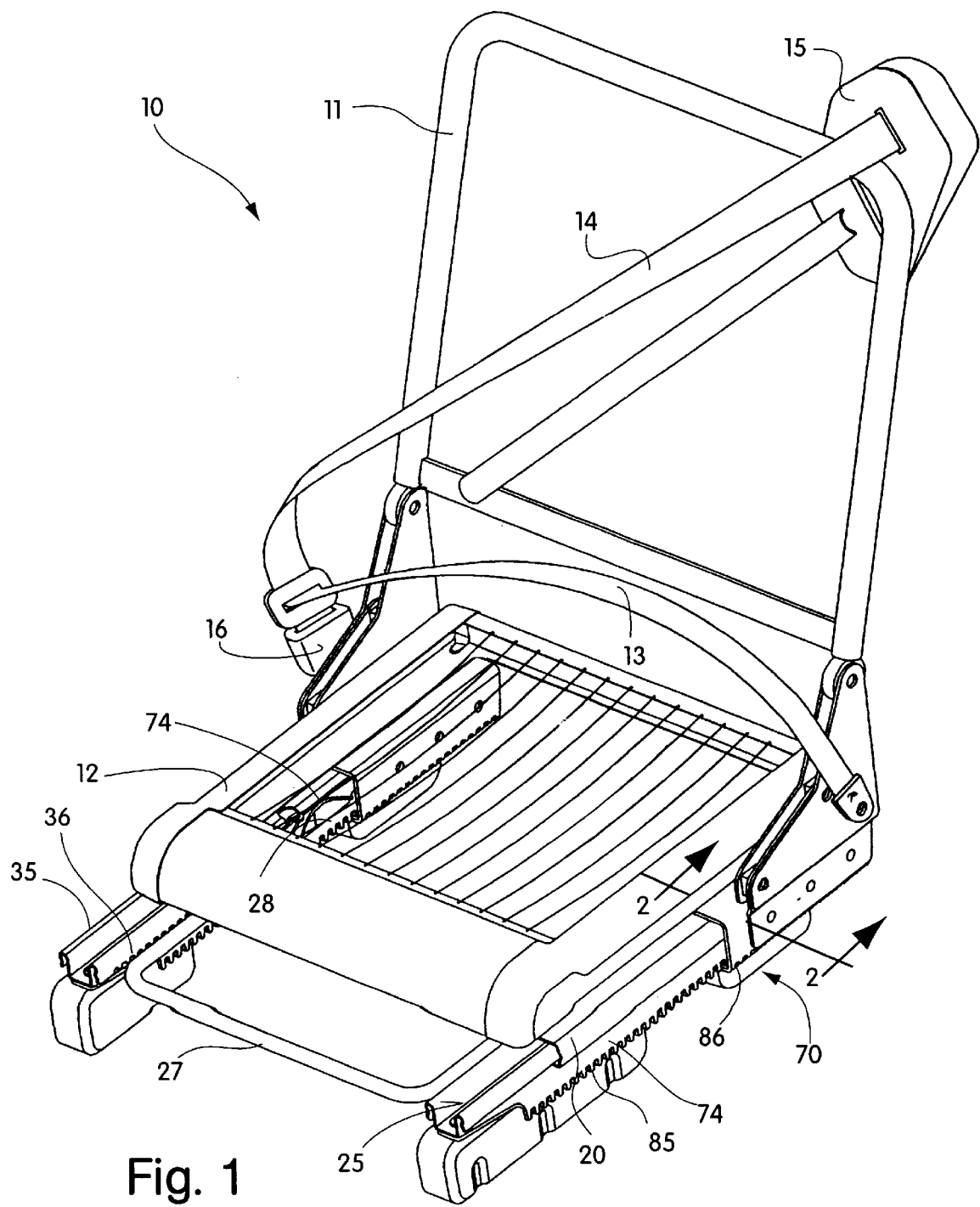
FIG. 1 is a perspective view of a preferred embodiment of a slidably adjustable vehicle seat assembly in accordance with a preferred embodiment.

It should be understood that the appended drawings are not necessarily to scale, presenting a somewhat simplified representation of various preferred features illustrative of the basic principles of the invention. The specific design features of a seat track assembly with an inertia latch as disclosed here, including, for example, the cross sectional thickness of the seat tracks, the specific dimensions of the gear and number of teeth of the gear will be determined in part by the particular intended application and use environment. Certain features of the illustrated embodiments have been enlarged or distorted relative to others to facilitate visualization and clear understanding. In particular, thin features may be thickened, for clarity of illustration, as for example the low friction coating applied to the lower track. All references to direction and position, unless otherwise indicated, refer to the orientation of the set track assembly device illustrated in the drawings. In general, lateral or laterally refers to a rightward or leftward direction in the plane of the paper in the cross sectional view of FIG. 2, and up, down or vertical refers to corresponding up, down and vertical directions in the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the seat track assembly and for the inertia latch disclosed herein. The following detailed discussion of various alternative and preferred features and embodiments will illustrate the general principles of the invention with reference to a seat track assembly with an inertia latch suitable for use in a motor vehicle. Most preferably the inertia latch may be used in conjunction with an all-belts-to-seat module. However, other embodiments suitable for other applications will be apparent given the benefit of this disclosure.

Referring now to the drawings, FIG. 1 is a perspective view of a preferred embodiment of a vehicle seat assembly 10, and in particular of an all-belts-to-seat assembly or module slidably adjustable in fore-and-aft directions. The seat assembly has a seat back 11 hingedly attached to a seat base 12, and typically serves as a frame for receiving springs and/or cushioning material. The seat base 12 has a pair of upper seat tracks 20,30 attached to its underside. The upper tracks 20,30 are axially slidable over a corresponding lower seat track sub-assembly comprising lower seat tracks 25,35 affixed to the floor of the motor vehicle. A seat belt assembly comprising a seat belt 13 and a shoulder belt 14 are directly attached to the seat assembly. A shoulder belt attachment 15 is positioned on the seat back and at least one seat belt attachment 16 may be affixed to the upper track or to a part rigidly attached to the upper track, such as the seat base.

Comfort adjustment of the seat assembly is accomplished by use of a master latch 28 attached to the upper seat tracks 20,30 and releasably engaging the lower seat tracks 25,35. In the embodiment shown in the drawings, the master latch has a series of latch windows which are urged by a spring 79 into engagement with a series of latch teeth 75,85 extending along each of the lower seat tracks. A towel bar 27 can be used to manually overcome the force of the spring, disengaging the latch windows from the latch teeth, allowing for operator adjustment of the upper tracks relative the lower tracks. Other comfort adjust mechanisms will be readily apparent to those skilled in the art given the benefit of this disclosure.

Figure 2:
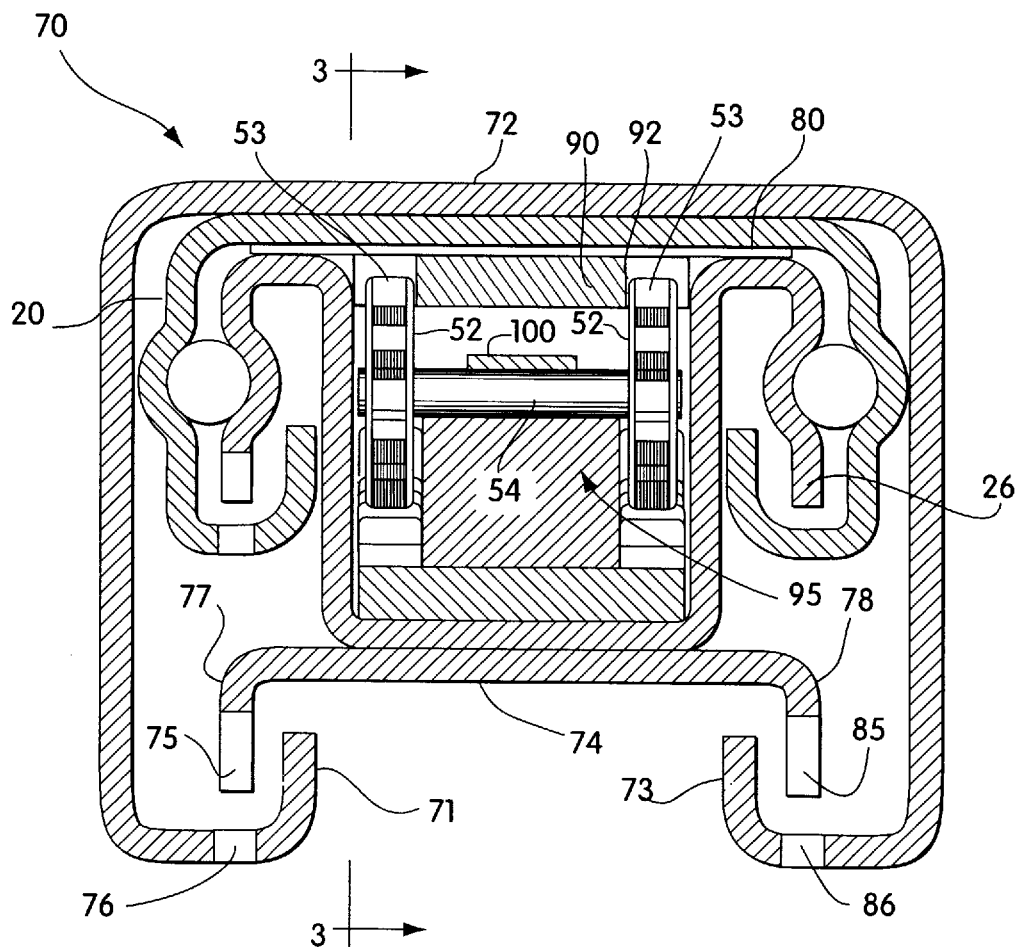
FIG. 2 is a cross sectional view of a portion of the vehicle seat assembly of FIG. 1 taken through line 2—2 of FIG. 1.
Figure 3:
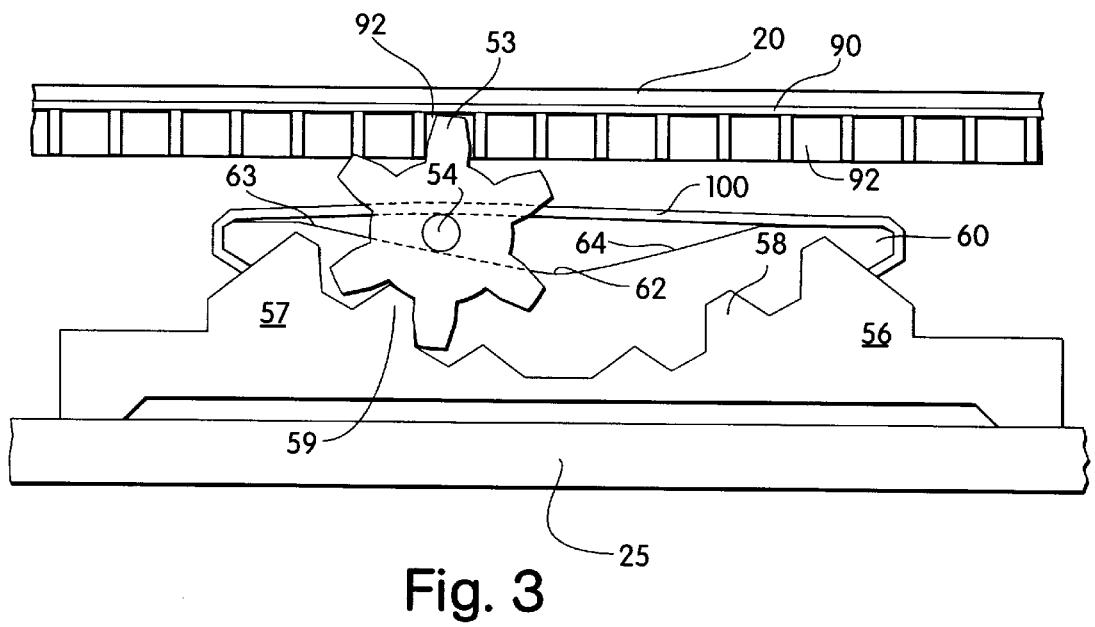
FIG. 3 is a partial side view of a portion of the vehicle seat assembly of FIG. 1 taken through line 3—3 of FIG. 2, showing the gear in a latching position.
Figure 4:
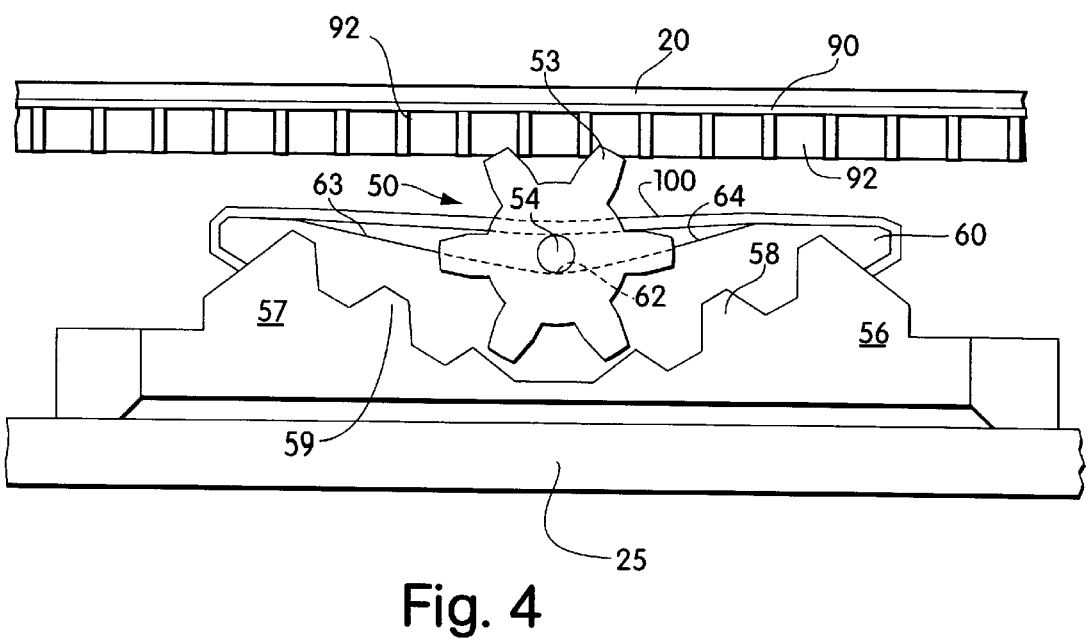
FIG. 4 is a partial side view of a portion of the vehicle seat assembly of FIG. 1 taken through line 3—3 of FIG. 2, showing the gear in a normal non-latching position.
Figure 5:
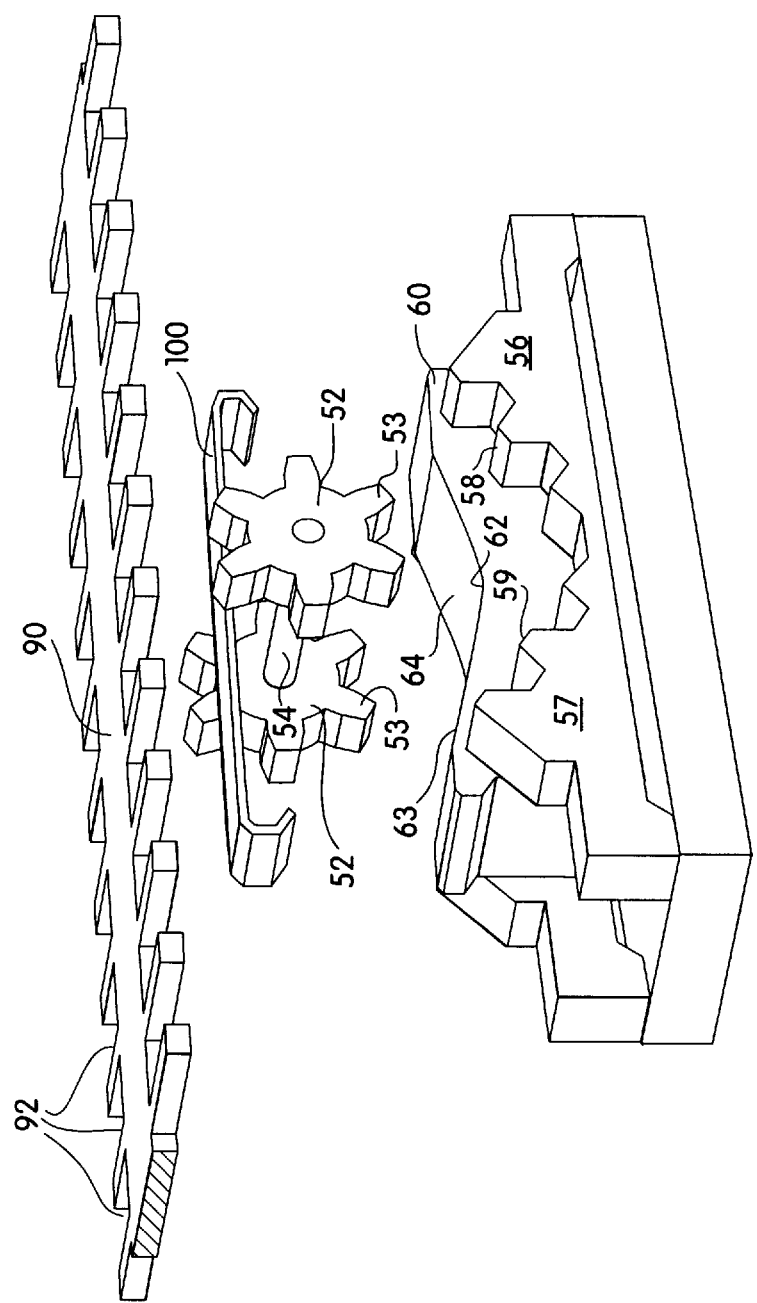
FIG. 5 is an exploded perspective view of a preferred embodiment of the inertia latch, showing the latch, gear, axle and base.

To restrict axial displacement of the upper seat tracks relative the lower seat tracks in the event of failure or interference with the master latch, an inertia latch 50 is used. FIGS. 2–4 show a preferred embodiment of an inertia latch 50 where the seat tracks are rollerless, allowing positioning of the inertia latch in a central opening 95 between the tracks. A gear 52 having a series of gear teeth 53 is preferably rotatably seated on a base 55 rigidly attached to the lower seat track 25. The base is described in greater detail below. In a normal condition the gear is in a non-latching position. (See FIG. 4.) An upper track sub-assembly may comprise the upper track 20 and a rack 90 having a series of openings 92. Normal comfort adjustment of the upper seat track 20 relative the lower seat track 25 causes the gear 52 to rotate as the gear teeth 53 engage openings 92 in rack 90. The gear maintains a positive engagement with the upper track sub-assembly at all times. To avoid interference with connecting rivets which attach, for example, the seat base 12 or reinforcing lateral structural beams, a second gears 152 like gear 52 is connected by an axle 54, positioned away from the center of the upper seat track. Other gear and axle configurations will be apparent to those skilled in the art given the benefit of this disclosure.

Optionally the openings 92 which receive the gear teeth may be positioned directly in the upper seat track, if other rivets and mounting holes are moved. Furthermore, to reduce sliding friction between the upper tracks and the lower tracks, an elongate glide strip 80 coated with a low-friction material such as, for example, teflon, may be positioned between the tracks. In the embodiment shown in the drawings, the glide strip is positioned between the rack 90 and the upper track 20.

Sudden vehicle change in velocity or acceleration (acceleration of course means acceleration or deceleration) is seen by the inertia latch as acceleration of the gear relative to the lower seat track sub-assembly. More specifically, this means that such acceleration is seen as acceleration of the gear relative to the lower seat track and/or to the incline. In many applications the gear will be designed to move to the latching condition in response to a certain preselected acceleration and for a certain preselected duration.

In response to a sudden change in vehicle velocity the gears 52, 152 move into a latching position where it engages a stop, locking the upper track with the lower track. The axle 54 of the gears is positioned on a contoured surface 60 of the base 55 having a valley 62 and a pair of side walls 63,64. In the normal, non-latching position, the axle sits in the valley 62. A spring 100 may be mounted to the base to urge the axle 54 and the gear towards the valley to minimize vibrational noise.

The description of gear 52 and related interacting mechanisms below is equally applicable to gear 152. The stop may comprise an incline 56,57 having a rack of teeth 58,59 which do not engage the gear teeth 53 when the gear 52 is in the normal, non-latching position. When a sudden change in velocity occurs, the inertia of the gear causes the axle to climb one of the side walls of the contoured surface 60. Thus, the gear moves into contact with the incline, and the gear teeth wedgingly lock with the rack of teeth on the incline as the gear moves into the latching position. Preferably the incline 56,57 and the base 55 are of unitary or one-piece construction. As best seen in FIGS. 3 and 4, the incline preferably slopes upward toward the upper track in two portions 56,57; the first portion 56 wedgingly lockingly engages the gear in a first latching position in response to a rapid change of velocity in a first direction, the second portion 57 wedgingly lockingly engages the gear in a second latching position in response to a rapid change in velocity in a second direction opposite the first direction. The normal, non-latching position of the gear is positioned between the first and second latching positions. Advantageously, once the sudden change in velocity has passed, the gear returns to the non-latching position as the upper seat track is moved in a direction opposite of the original inertia force. Other suitable base and incline designs will be apparent to those skilled in the art given the benefit of this disclosure.

In addition to resisting fore-and-aft sliding of the upper seat track, it may be necessary to resist upward dislocation of the upper seat tracks relative the lower seat tracks, particularly in an all-belts-to-seat (ABTS) application where the center of gravity of such seat modules is typically above the seat track sub-assembly. This is important since the seat assembly in ABTS seat module designs is only attached to the rest of the motor vehicle through the interconnection between the upper track sub-assembly and the lower track sub-assembly. An ABTS latch 70 can be used to resist vertical dislocation of the upper seat track sub-assembly. The ABTS latch may be damaged if it is engaged. An inertia latch 50 as described above may advantageously be used in conjunction with the ABTS latch. Preferably the inertia latch can engage before the ABTS latch engages so as to non-destructively resist fore-and-aft axial sliding of the upper track and absorb some of the loading produced by the sudden change in velocity. One example of an ABTS latch is shown in FIGS. 1 and 2, and comprises an upper bracket 72 attached to the upper seat track sub-assembly and a lower bracket 74 attached to the lower seat track sub-assembly. The upper bracket has at least one J-hook 71, and the lower bracket 74 has at least one downward flange 77 corresponding to each J-hook. The downward flange 77 is received by the corresponding J-hook 71 so as to allow fore-and-aft travel of the upper seat track 20 in a normal condition, such as when the seat assembly position is adjusted for comfort. In response to a load on the seat producing a vertical dislocation, the J-hook 71 will engage the downward flange 77 and thereby limit such vertical dislocation.

In the preferred embodiment shown in the drawings each downward flange 77,78 has a series of teeth 75,76 positioned above openings 85,86 corresponding J-hooks. As the upper track 20 attempts to dislocate, the teeth 75 engage the openings 76 to fix the position of the upper seat track 20 and to resist further fore-and-aft and vertical dislocation.

In the embodiment shown in the drawings, a pair of J-hooks 71,73 and a pair of downward flanges 77,78 are shown, working in tandem to resist vertical dislocation of upper track 20. Other suitable ABTS latches and dislocation position-fixing means will be apparent to those skilled in the art such as, for example, incorporating the teeth into the J-hook and placing the receiving openings in the downward flange.

It will be apparent to those skilled in the art given the benefit of this disclosure to design inertia latches as described and claimed here having different mass, rotational friction, slope and longitudinal direction of the incline, etc., cooperating to cause engagement of the inertia latch upon vehicle accelerations (here again meaning vehicle accelerations or decelerations) beyond a preselected or desired limit.

From the foregoing disclosure and detailed description of certain preferred embodiments, it will be apparent that various modifications, additions and other alternative embodiments are possible without departing from the true scope and spirit of the invention. For example, seat track assemblies using inertia latches as disclosed above may be used on seats adjustable in more directions that just forward and backward; four-way and six-way adjustable seats may use such inertia latches. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly for a motor vehicle comprising, in combination:

an upper track sub-assembly comprising an upper track;

a lower track sub-assembly comprising a lower track and a stop, the upper track being slidable over a principal load bearing surface of the lower track;

a positive engagement inertia latch comprising a gear free of the principal load bearing surface and mounted for longitudinal travel in response to longitudinal acceleration relative to the lower track sub-assembly, the inertia latch having a latching condition in which the gear is in an engagement position engaging the upper track sub-assembly and the stop, and the inertia latch resists longitudinal movement of the upper track sub-assembly relative to the lower track sub-assembly, and a non-latching condition in which the gear is in a non-engagement position not engaging the stop; and a base attached to the lower track sub-assembly, wherein the base comprises a contoured surface forming a valley and a pair of sloped walls extending longitudinally fore-and-aft of the valley, and the gear has an axle which is positioned on the contoured surface.

2. The seat track assembly of claim 1 wherein the gear in the non-engagement position is rotatable in response to longitudinal movement of the upper track sub-assembly relative to the lower track sub-assembly.

3. The seat track assembly of claim 1 wherein the stop comprises an incline affixed to the lower track sub-assembly and the gear is mounted for longitudinal travel up the incline toward the engagement position in response to longitudinal acceleration of the gear relative to the lower track sub-assembly.

4. The seat track assembly of claim 3 further comprising gear teeth on the gear and a rack of teeth on the incline which engage the gear teeth as the gear moves to the latching position.

5. The seat track assembly of claim 1 wherein the axle moves up the sloped walls of the contoured surface in response to acceleration of the gear relative to the lower track sub-assembly.

6. The seat track assembly of claim 1 wherein the gear is in the valley in the non-latching position.

7. The seat track assembly of claim 1 further comprising a spring mounted on the base producing a biasing force on the axle.

8. The seat track assembly of claim 1 further comprising gear teeth on the gear wherein the upper track has a series of slots which receive at least one tooth of the gear.

9. The seat track assembly of claim 1 further comprising gear teeth on the gear wherein the upper seat track sub-assembly further comprises a rack affixed to the upper track and the rack has a series of slots which receive at least one tooth of the gear.

10. The seat track assembly of claim 1 further comprising a second gear being connected to the first gear by an axle positioned on a contoured surface of a base, each of the gear having gear teeth, and the stop comprises first and second symmetrical inclines having rack teeth corresponding to the first and second gears, respectively, wherein in response to acceleration of the gear relative to the lower track sub-assembly, the first and second gear teeth engage the teeth on the corresponding inclines, restricting motion of the upper track relative the lower track.

11. The seat track assembly of claim 1 further comprising an elongate glide strip affixed to the upper track, reducing sliding friction between the upper track and the principal load bearing surface of the lower track.

12. A seat track assembly for a motor vehicle seat, comprising, in combination:
an upper track sub-assembly comprising an upper track;
a lower track sub-assembly comprising a lower track, the upper track being axially slidable over the lower track, forming a central opening between the upper track and the lower track;
a comfort adjust latch assembly for latching the upper track sub-assembly to the lower track sub-assembly at a desired position; and
an auxiliary positive engagement inertia latch for resisting axial sliding motion of the upper track sub-assembly relative the lower track sub-assembly in response to a sudden change in velocity, positioned in the central opening, comprising:
a base attached to the lower seat track sub-assembly, the base having a contoured surface having a valley and a pair of sloped walls, and a unitary incline; and
a gear rotatable in response to axial sliding of the upper track sub-assembly, the gear being movable between a non-latching position wherein the gear is rotatable in the valley in response to axial sliding of the upper track sub-assembly, and a latching position wherein in response to acceleration of the gear relative the lower track sub-assembly the gear engages the incline, wedgingly locking the upper track sub-assembly with the lower track sub-assembly;
wherein the incline has first and second sloped surfaces, and the gear lockingly engages the first sloped surface in a front latching position in response to acceleration of the gear relative the lower track sub-assembly in a first direction, and the gear lockingly engages the second sloped surface of the incline in a rear latching position in response to acceleration of the gear relative the lower track sub-assembly in a second direction opposite the first direction.

13. The seat track assembly of claim 12 wherein the gear further comprises gear teeth and the incline further comprises a rack of teeth which engage the gear teeth as the gear moves into one of the latching positions.

14. The seat track assembly of claim 12 further comprising a spring mounted on the base producing a biasing force on the gear urging the gear towards the base.

15. The seat track assembly of claim 12 wherein the gear has gear teeth and the upper track sub-assembly further comprises a series of openings sized to receive the gear teeth.

16. A motor vehicle seat assembly comprising, in combination:
a seat track assembly comprising first and second lower track sub-assemblies for mounting to a motor vehicle generally horizontally and laterally spaced from each other, first and second upper track sub-assemblies axially slidable on the first and second lower track sub-assemblies respectively;
positive engagement inertia latches for resisting axial sliding motion of the upper track sub-assemblies relative the lower track assemblies in response to a sudden change in velocity, each comprising a gear rotatable in response to axial sliding of one of the upper track sub-assemblies, a gear being movable between a non-latching position wherein the gear is rotatable in response to axial sliding of one of the upper track sub-assemblies and a latching position wherein in response to acceleration of the gear relative the lower track sub-assemblies the gear moves into wedging engagement with one of the lower track sub-assemblies, locking the corresponding upper track assembly; and
an all-belts-to-seat latch comprising:
a pair of upper brackets attached to the corresponding first and second upper seat track sub-assemblies, each having first and second J-hooks; and
a pair of lower brackets attached to the corresponding first and second lower seat track sub-assemblies, each having at least one downward flange corresponding to each J-hook;
wherein each of the downward flange is received respectively by one of the corresponding J-hooks; permitting fore-and-aft travel in a normal operating condition, and limiting vertical dislocation of the upper track sub-assemblies relative to the lower track sub-assemblies, each of the downward flange and said corresponding J-hook cooperatively providing dislocation position-fixing means for resisting fore-and-aft movement of each said J-hook relative to each said downward flange upon upward dislocation of the upper track sub-assemblies relative to the lower track sub-assemblies.

17. The motor vehicle seat assembly of claim 16 further comprising a seat belt attachment mounted to the first upper track sub-assembly.

18. The motor vehicle seat assembly of claim 16 further comprising a second downward flange on each lower bracket received by the second J-hook on each upper bracket, cooperating with the first downward flange and the first J-hook to permit fore-and-aft travel in the normal operating condition and limit vertical dislocation of the upper track sub-assemblies relative the lower track sub-assemblies, with the second downward flange and the second J-hook cooperatively providing second dislocation position-fixing means for resisting fore-and-aft movement of the second J-hook relative to the downward flange upon upward dislocation of the upper track sub-assemblies relative the lower track sub-assemblies.

19. A seat track assembly for a motor vehicle comprising, in combination:

an upper track sub-assembly comprising an upper track;

a lower track sub-assembly comprising a lower track, an incline and a stop, the upper track being slidable over the lower track; and a positive engagement inertia latch comprising a movable member mounted for longitudinal travel in response to longitudinal acceleration relative to the lower track sub-assembly, the inertia latch having a latching condition in which the movable member is in an engagement position engaging the upper track sub-assembly and the stop, and the inertia latch resists longitudinal movement of the upper track sub-assembly relative to the lower track sub-assembly, and a non-latching condition in which the movable member is in a non-engagement position not engaging the stop, the movable member being positioned in a central opening between the upper and lower seat tracks;

wherein the incline has first and second sloped surfaces, and the movable member lockingly engages the first sloped surface in a front latching position in response to acceleration of the movable member relative to the lower track sub-assembly in a first direction, and the movable member lockingly engages the second sloped surface of the incline in a rear latching position in response to acceleration of the movable member relative to the lower track sub-assembly in a second direction opposite the first direction.

20. A seat track assembly for a motor vehicle comprising, in combination:

an upper track sub-assembly comprising an upper track;

a lower track sub-assembly comprising a lower track and a base having a stop, the upper track being slidable over the lower track;

a positive engagement inertia latch comprising engagement means for engaging the lower track sub-assembly, movable between a latching condition in response to longitudinal acceleration relative to the lower track sub-assembly, engaging the upper track sub-assembly and the stop, wherein the inertia latch resists longitudinal movement of the upper track sub-assembly relative to the lower track sub-assembly, and a non-latching condition in which the inertia latch does not engage the stop; and a spring mounted on the base producing a biasing force on the engagement means urging the engagement means towards the base.

* * * * *